United States Patent [19]
Kersting et al.

[11] Patent Number: 5,460,423
[45] Date of Patent: Oct. 24, 1995

[54] TONNEAU COVER ASSEMBLY AND CROSS-BOW CLIP

[75] Inventors: Benjamin M. Kersting, Bristol; Ross Weldy, Elkhart, both of Ind.

[73] Assignee: Custom Form Manufacturing, Inc., Elkhart, Ind.

[21] Appl. No.: 29,693

[22] Filed: Mar. 11, 1993

[51] Int. Cl.[6] .................................................. B60J 7/10
[52] U.S. Cl. ........................... 296/100; 296/104; 403/27; 403/230
[58] Field of Search ................................... 296/100, 104, 296/118, 119; 403/27, 230, 240, 329

[56] References Cited

U.S. PATENT DOCUMENTS

| | | | |
|---|---|---|---|
| D. 55,792 | 7/1920 | Hudgins | D8/89 |
| 307,978 | 11/1884 | Parks | 296/104 |
| 2,503,683 | 4/1950 | Perkins | 81/3.55 |
| 3,222,103 | 12/1965 | Wernig et al. | 296/136 |
| 3,223,446 | 12/1965 | Coppock et al. | 296/136 |
| 3,578,378 | 5/1971 | Anderson | 296/100 |
| 3,727,972 | 4/1973 | Belk | 296/100 |
| 3,773,379 | 11/1973 | Loiseau | 296/107 |
| 3,936,077 | 2/1976 | Bilek | 280/423.1 |
| 3,995,649 | 12/1976 | Robichaud | 135/102 |
| 4,036,521 | 7/1977 | Clenet | 296/100 |
| 4,061,394 | 12/1977 | Vodin | 296/100 |
| 4,197,626 | 4/1980 | Golovich | 29/270 |
| 4,248,475 | 2/1981 | Johnsen | 296/100 |
| 4,273,377 | 6/1981 | Alexander | 296/100 |
| 4,479,677 | 10/1984 | Gulette et al. | 296/98 |
| 4,496,184 | 1/1985 | Byrd et al. | 296/100 |
| 4,506,688 | 3/1985 | Bethoon et al. | 135/107 |
| 4,547,014 | 10/1985 | Wicker | 296/100 |
| 4,639,033 | 1/1987 | Wheatley et al. | 296/100 |
| 4,647,103 | 3/1987 | Walblay | 296/100 |
| 4,730,866 | 3/1988 | Nett | 296/100 |
| 4,792,179 | 12/1988 | Stevens | 296/100 |
| 4,807,921 | 2/1989 | Champie, III et al. | 296/98 |
| 4,838,602 | 6/1989 | Nett | 296/100 |
| 4,861,092 | 8/1989 | Bogard | 296/100 |
| 4,877,283 | 10/1989 | Little et al. | 296/100 |
| 4,902,065 | 2/1990 | Thralls | 296/104 |
| 4,923,240 | 5/1990 | Swanson | 296/100 |
| 4,936,724 | 6/1990 | Dutton | 410/110 |
| 4,953,820 | 9/1990 | Yoder | 248/231.5 |
| 5,058,652 | 10/1991 | Wheatley et al. | 160/327 |
| 5,121,960 | 6/1992 | Wheatley | 296/100 |

FOREIGN PATENT DOCUMENTS

| | | | |
|---|---|---|---|
| 613741 | 10/1979 | Switzerland . | |
| 2056 | 3/1990 | WIPO | 296/100 |

*Primary Examiner*—Andrew C. Pike
*Attorney, Agent, or Firm*—Barnes & Thornburg

[57] ABSTRACT

A tonneau cover assembly includes a frame attached to the sidewalls of a pick-up truck, one or more clamps to secure the frame in place, a flexible cover which spans the bed of the vehicle, one or more cross-bows which support the flexible cover, and a plurality of cross-bow clips. The cross-bow clips are telescopically engageable with the distal ends of the cross-bow, and can effectively lengthen or shorten the cross-bow. The cross-bow clips are engageable with the top rail of the tonneau cover frame. More specifically, the cross-bow clip includes a pair of projections which are engageable with the two longitudinally extending channels of the top rail. The first projection is hollow, and is somewhat resilient. Thus, it may snugly fit and form to the dimensions of the first channel. The second projection is solid, and rests within the second channel. The cross-bow clip of the present invention allows the cross-bows to be easily mounted to or dismounted from the top rail of the tonneau cover frame.

1 Claim, 2 Drawing Sheets

TONNEAU COVER ASSEMBLY AND CROSS-BOW CLIP

BACKGROUND AND SUMMARY OF THE INVENTION

The present invention relates primarily to tonneau covers for vehicles. More specifically, the present invention relates to a novel system for attaching a tonneau cover cross-bow to a tonneau cover frame.

In recent years, tonneau covers have become very popular, and can be seen in use every day. Generally, a tonneau cover is a device which is used to cover an opening in a vehicle. Tonneau covers are commonly used to cover seating sections of boats and convertible cars. However, tonneau covers are probably most commonly associated with pick-up trucks. Tonneau covers are useful accessories to pick-up trucks and other vehicles because they can provide protection from the elements for cargo being transported.

Typically, tonneau cover assemblies include a cover which spans the bed of the truck and a frame network which supports the cover. Known tonneau cover assemblies utilize a rail network around the bed of the truck, to which the cover is attached. Tonneau cover assemblies may be divided into two general categories: those with a flexible cover, and those with a rigid cover. Tonneau cover assemblies using a rigid cover generally include a single rigid cover member which is attached to the frame. Because of the rigidity of the cover, the exterior frame network is able to adequately support the cover.

Tonneau cover assemblies utilizing a flexible cover generally include one or more cross-bows which span the pick-up truck bed or cargo area being covered. The cross-bows support the weight of the cover, as well as other elements or objects placed thereon. For example, the weight of water or snow can cause a flexible tonneau cover to sag. This not only causes deterioration of the cover, but also reduces its effectiveness to cover items being hauled in the truck. Thus, when a flexible cover is used, it is often beneficial to use one or more cross-bows to support the weight of the cover.

The use of cross-bows in a tonneau cover assembly is not without drawbacks. For example, it is often desirable to have a tonneau cover assembly which can be mounted and dismounted from a vehicle with relative ease, in a short period of time. If the cross-bow is mounted in an elaborate manner, or requires the use of tools to be mounted or dismounted, the cross-bow is of limited benefit. Thus, cross-bows which can be mounted and dismounted in a short period of time, without the need of tooling, are beneficial.

Another problem experienced by known tonneau cover assemblies is caused by vehicle vibration. When a vehicle is in use, vibrational forces can act upon the engagement of the cross-bows to the vehicle or tonneau cover frame. Over time, these forces can cause the cross-bow to loosen, or even break free from its connection to the tonneau frame or vehicle. Thus, it is beneficial to have a cross-bow which is securely connected such that it may resist vibrational forces.

In addition to vibrational forces, other forces will act upon the tonneau cross-bow. The weight of the cover itself, the tension in the cover, and the natural shrinkage of the cover all tend to provide a bending moment or torsional effect on the cross-bows. This can affect both the attachment of the cross-bow to the vehicle, and of the frame network to the vehicle. Such a bending or torsional force can cause the rail to separate from the vehicle sidewall, allowing water or air to seep into the truck bed. Over time, this bending or torsional force can cause the rail network to warp or become deformed.

The torsional forces can also cause warping or bending of the cross-bows. Over time, this can reduce the effectiveness of the cross-bow in supporting the tonneau cover. Thus, it is desired that the cross-bow be able to resist the twisting or torsional forces which may be applied thereto.

A similar problem may be faced when the flexible cover has been detached from the tonneau cover frame assembly. When the cover has been removed from the tonneau cover frame, the cross-bows are left exposed to the elements. External forces, such as those caused by the wind, can cause the cross-bows to become partially or totally disengaged from the tonneau cover frame. Additionally, objects being hauled in the truck may come into contact with the cross-bows, jarring them loose from their connection to the tonneau cover frame.

Known cross-bows are further limited by their restrictive ability to be positioned to the frame of the tonneau cover. Certain known cross-bow assemblies are attached directly to the tonneau cover frame. However, these assemblies, due to this attachment, are unable to withstand the torsional forces described above. A second known method of attachment has the cross-bow connected to the clamps which secure the frame to the truck. This limitation is undesirable, as it is thus necessary to position a clamp at every location at which a cross-bow is desired. To add an additional cross-bow to support the cover, an extra pair of clamps must be obtained, and secured to the tonneau cover frame. Thus, it is desired to utilize a cross-bow assembly which is not dependent upon the clamp as a securing base.

Accordingly, it is an object of the present invention to provide a tonneau cover assembly which utilizes cross-bows that are able to withstand the various forces, including torsional forces, which may be applied to the cross-bow.

Another object of the present invention is to provide a tonneau cover assembly which is able to withstand the vibrational forces caused through everyday usage of the vehicle.

Yet another object of the present invention is to provide a tonneau cover assembly in which the cross-bows can be mounted directly to the tonneau cover frame, independent of the clamp or securing device.

A further object of the present invention is to provide a tonneau cover assembly which allows the cross-bows to be easily and quickly attached to the tonneau cover frame and removed from the tonneau cover frame.

These and other objects are attained by a tonneau cover assembly generally including a frame, one or more securing elements, such as a clamp, a flexible cover, one or more cross-bows, and one or more cross-bow clips. The frame includes a rail which is secured to the top surface of the vehicle sidewall, around its periphery. The clamps are used to securely fasten the rail to the vehicle. The flexible tonneau cover is fastened to the rail, and covers the bed of the vehicle. One or more cross-bows span the bed, and support the weight of the flexible cover.

The cross-bow clips are used to attach the cross-bows directly to the top rail of the frame. Typically, the cross-bow is a hollow, light-weight longitudinally extending bar. The cross-bow typically has one or more crimps therein to provide it with additional rigidity and strength. The cross-bow will typically have a generally uniform cross-section, such as a circle or rectangle. The cross-bow clip of the present invention is designed to engage the cross-bow at either distal end of the cross-bow.

The cross-bow clip is a generally rigid structure, made of a durable, weather-resistant plastic. The cross-bow clip includes a cross-bow engaging portion, including a hole, which telescopically accepts a distal end of the cross-bow. The hole of the cross-bow clip is slightly larger than, and of the same general cross-sectional configuration as, the cross-bow. The hole in the cross-bow clip has sufficient depth to allow for the distal end of the cross-bow to be telescopically received therein. Thus, the length of the cross-bow may be effectively lengthened or shortened by positioning the cross-bow clip at various longitudinal locations with respect to the cross-bow. A viewing slot is provided in the cross-bow clip to allow for visual determination of the position of the cross-bow within the clip.

Opposite the cross-bow engaging portion of the clip, the clip includes a means for engaging the top rail of the tonneau cover frame. A typical top rail includes two longitudinal channels therein. The cross-bow clip of the present invention includes two projections which can be positioned within the two channels in the top rail. The first projection is substantially hollow, and provides some flexibility to secure a snug engagement with the first channel. The second projection is substantially rigid, and engages the second channel of the top rail. The two projections are angled generally downwardly at differing angles. The angles at which the two projections extend allow the cross-bow clip to snap-lock into engagement with the rail.

In this manner, the cross-bows may be snap-fit directly into the top rail of the tonneau cover frame. It is not necessary to coordinate the cross-bows with the clamp or securing mechanism of the frame. Furthermore, the telescoping nature of the clip and cross-bow allows the cross-bow to be effectively lengthened or shortened, compensating for dimensional differences in individual vehicle beds and cross-bows. The cross-bow clip provides support for the cross-bow around its entire periphery, thus limiting the effects of torsional forces on the cross-bow. The cross-bow assembly can be easily positioned and removed without the use of tools.

Other objects, advantages, and novel features of the present invention will become apparent in the following detailed description of the invention when considered in conjunction with the accompanying drawings.

DETAILED DESCRIPTION OF THE PREFERRED EMBODIMENTS

Figure 1:
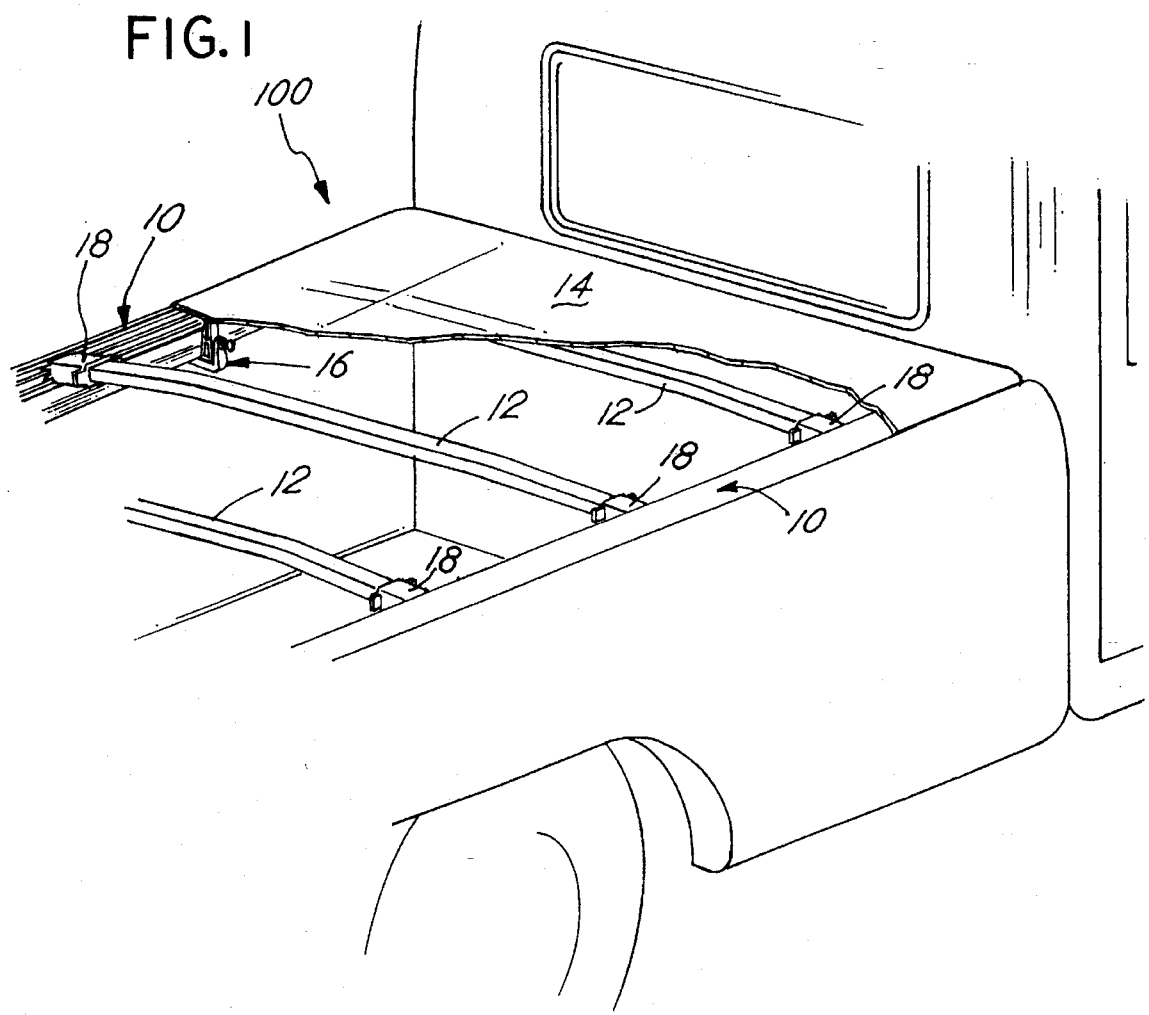
FIG. 1 is a perspective view of the tonneau cover assembly of the present invention, as attached to a vehicle.

The present invention is directed to a tonneau cover assembly which is specifically designed to be used in conjunction with a pick-up truck. Tonneau cover assembly 100 covers the open bed portion of the vehicle, thus securing items being hauled therein safe from the elements. Tonneau cover 100 of the present invention generally includes frame 10, one or more cross-bows 12, flexible cover 14, one or more clamps 16, and one or more cross-bow clips 18. Frame 10 is secured to the top surface of the pick-up truck by clamps 16. Cross-bows 12 are arched across the bed of the vehicle, to support the weight of cover 14. Cover 14 is attached about its periphery to frame 10, and covers the bed of the truck.

Typically, a tonneau cover assembly will include three or four cross-bows 12. Each cross-bow 12 spans the width of the truck bed or cargo area being covered by the tonneau assembly. Because of weight concerns, each cross-bow 12 is typically hollow, and made from a sturdy, rigid material such as aluminum. Each cross-bow 12 is slightly arched, both for aesthetic reasons and for providing additional support for cover 14.

Frame 10 includes top rail 20, which is positioned against the top surface of the truck sidewall. Typically, top rail 20 is secured to the vehicle sidewall by one or more securing devices, such as clamp 16. Once secured to the vehicle sidewall, top rail 20 is able to support cross-bows 12 and cover 14. Top rail 20 includes first channel 22 and second channel 24 therein. These channels are open to the interior of the truck bed, and extend longitudinally in top rail 20.

Cover 14 is typically a flexible, water resistant fabric, such as vinyl. When cover 14 is mounted to frame 10, covering the pick-up truck bed, the weight of the cover can cause it to sag. Thus, cross-bows 12 are positioned to span the width of the pick-up truck bed and provide support for cover 14. To overcome the weight of cover 14, as well as snow, water, and other objects placed on the cover, it is beneficial that the cross-bows be securely mounted to frame 10.

Previously known cross-bow arrangements have either been mounted directly to frame 10, or have included an insert which connects the cross-bow to the clamp or securing device. As discussed earlier, both of these arrangements are undesirable. Thus, the inventors have invented clip 18 which connects cross-bow 12 to top rail 20. Preferably, clip 18 is made of a durable, weather resistant material, such as Polypropylene. Furthermore, it is also preferred that cross-bow 12 include one clip 18 at each distal end thereof. However, it should be well understood that the present invention is not limited to such an arrangement.

Clip 18 includes a cross-bow engaging portion and a top rail attachment portion. The cross-bow engaging portion includes hole 30 being surrounded by exterior casing 32. Hole 30 is dimensioned to snugly receive a distal end of cross-bow 12 therein. As shown, hole 30 is generally rectangular in cross section to correspond to the cross section of cross-bow 12. It should be well understood that the cross sectional geometry of both hole 30 and cross-bow 12 may be modified. However, it is preferred that the two components be of a similar cross section, such that cross-bow 12 may be snugly received within hole 30.

Hole 30 has a depth dimension which allows various lengths of cross-bow 12 to be received therein. As truck beds will vary in actual dimensions, as will cross-bows 12, it is beneficial to provide for this margin of error. Thus, as each distal end of cross-bow 12 is telescopically inserted into hole 30 of clip 18, it can be inserted fully into the hole until the cross-bow abuts the back wall of the hole, or it can be positioned at some intermediate depth within the hole. This is the essence of the telescoping relationship between cross-bow 12 and hole 30. If cross-bow 12 is not an exact fit within the width of the pick-up truck bed, it can be effectively lengthened or shortened through its positioning relative to clip 18.

Hole 30 of clip 18 has a depth of approximately 1.6 inches. The inventors have found this dimension to provide adequate support for cross-bow 12 and sufficient clearance to allow for some longitudinal translation of the cross-bow with respect to clip 30. However, it should be readily understood that the depth of hole 30 may be modified to allow for more or less translation between the cross-bow and the clip.

Figure 2:
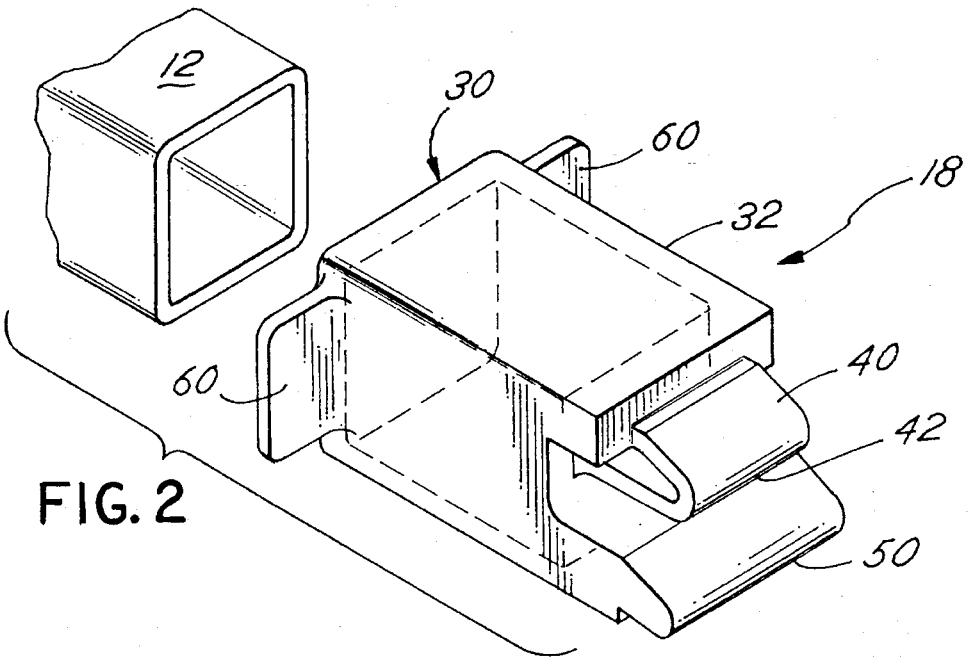
FIG. 2 is an exploded perspective view of a cross-bow clip of the present invention showing the relative engagement of the cross-bow clip to the cross-bow.

Clip 18 also includes a top rail attachment portion. As shown in FIG. 2, the top rail attachment portion is substantially opposite hole 30. The top rail attachment portion allows clip 18, and thus cross-bow 12, to be attached directly to frame 14, and in particular to top rail 20. This eliminates the need for a clamp or other securing device to act as a base or standard for cross-bow 12. The preferred embodiment of the present invention allows clip 18 to engage the two channels of top rail 20. It should be well understood that clip 18 could be attached to only one of the channels, or to other portions of top rail 20.

The top rail attachment portion of clip 18 includes first projection 40 and second projection 50. These two projections are designed to be received within the two channels on top rail 20. First projection 40 is a generally hollow loop. Though relatively stiff, first projection 40 exhibits some resiliency when inserted into first channel 22. Second projection 50 is preferably solid, and is angled slightly away from first projection 40. As shown, second projection 50 is positioned substantially directly below first projection 40, approximately equal in distance to the spacing between first channel 22 and second channel 24 of top rail 20.

Second projection 50 is designed to be inserted into second channel 24. The fit between second projection 50 and second channel 24 is preferably somewhat loose, with clearance both above and below the second projection. First projection 40 is slightly tapered at distal end 42. Tapered distal end 42 allows first projection 40 to be easily received within first channel 22. As first projection 40 is pushed further into first channel 22, the projection is tightly received within the channel.

Figure 3:
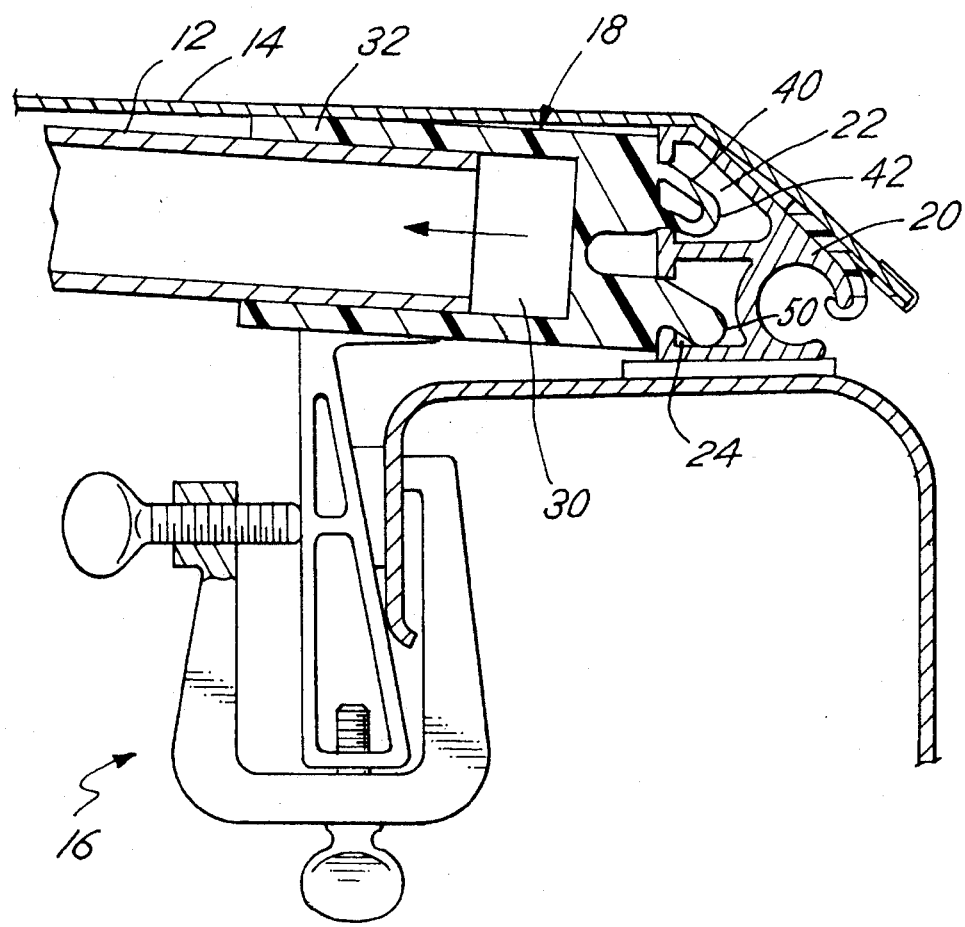
FIG. 3 is a cross-sectional view of the cross-bow clip of the present invention in engagement with a cross-bow and tonneau cover frame.

As can be seen in FIG. 3, first projection 40 and second projection 50 are both angled generally downwardly from the horizontal. In an illustrative embodiment, first projection 40 is angled approximately 20° below the horizontal, and second projection 50 is angled approximately 30° below the horizontal. It should be well understood that the angle at which the projections extend is not a limitation of the present invention. The angles at which the two projections extend allow cross-bow clip 12 to be received within top rail 20 in a snap-lock fit.

Cross-bow clip 18 also includes a pair of opposing viewing slots 70. Each viewing slot 70 extends generally longitudinally, within casing 32. The viewing slot 70 extends from adjacent first projection 40 to an intermediate position in the casing. Viewing slot 70 allows a user to visually determine the position of cross-bow 12 within clip 18. Clip 18 may also include an orifice which facilitates the manufacture of the clip.

Clip 18 of the present invention also includes a disengagement portion. The disengagement portion assists in the removal of clip 18 from top rail 20, and also in the removal of clip 18 from cross-bow 12. Preferably, the disengagement portion includes an opposing pair of flaps, or shoulders, 60, positioned on opposite sides of hole 30. Each flap 60 extends from, and generally orthogonal to, casing 32.

Figure 4:
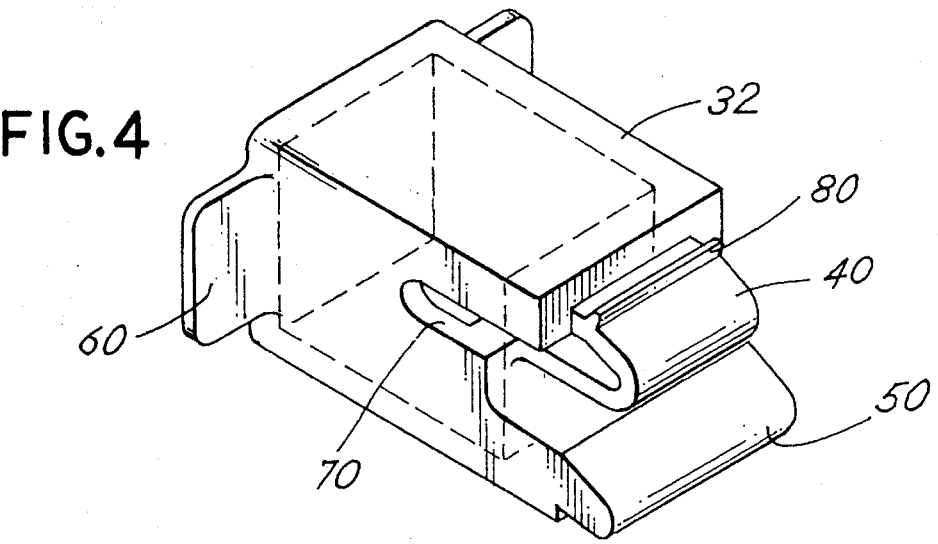
FIG. 4 is a perspective view of a second illustrative embodiment of the cross-bow clip of the present invention.

A second illustrative embodiment of clip 18 is shown in FIG. 4. In this embodiment, first projection 40 includes detent 80 thereon. Detent 80 is raised slightly from the exterior of first projection 40. As shown, detent 80 may extend across the entire width of the projection. However, it should be well understood that detent 80 may take other forms. When clip 18 is inserted into engagement with top rail 20, detent 80 insures that the clip will not readily disengage the rail. As first projection 40 is inserted into first channel 22, detent 80 provides resistance. When this resistance is overcome, first projection 40 may be inserted into the channel. Detent 80 then, resting substantially within first channel 22, provides resistance to the disengagement of the cross-bow clip from the channel.

Having described the structure of the present invention, its function can be well understood. When it is desired to mount cross-bow 12 to frame 10, clip 18 is positioned about the distal ends of the cross-bow. While the present invention may be practiced utilizing one clip 18, it is preferred that a clip 18 be mounted onto each distal end of cross-bow 12. The end of cross-bow 12 is inserted into hole 30 of clip 18 until it abuts the end wall of the hole.

Cross-bow 12, with clips 18 on opposite ends, is then connected to top rail 20 of frame 10. Second projection 50 is inserted into second channel 24, in a direction substantially orthogonal to the longitudinal axis of top rail 20. Clip 18 is further positioned such that first projection 40 engages first channel 22. The resiliency of first projection 40 provides it with a snug, tight fit with first channel 22.

Clip 18 on the opposite end of cross-bow 12 is then positioned into the opposite top rail 20 in a similar fashion. Cross-bow 12 may be shifted with respect to each clip 18, such that it no longer abuts the back wall of hole 30. In this manner, the entire length of cross-bow 12 having clips 18 thereon may be effectively lengthened or shortened.

Once fully secured to frame 10, cross-bow 12 effectively supports cover 14. The arch in cross-bow 12 acts as a compression force on the opposing clips 18, thus securing their engagement to top rail 20. The distal ends of cross-bow 12 are surrounded on all sides by casing 32, and thus the cross-bow is not susceptible to displacement due to high winds or other forces. Once in position, cross-bow 12 is effectively prevented from translational motion, but may slide relative to top rail 20, parallel to its longitudinal axis. The position of cross-bow 12 within clip 18 can be visually determined by looking through viewing slot 70.

When it is desired to remove cross-bow 12 from the vehicle, the disengaging portion of clip 18 can be used. Pressure is applied to opposing flaps 60, in a direction substantially away from top rail 20. This causes the distal ends of cross-bow 12 to abut the back wall of hole 30. This provides the clearance needed to remove the projections on clip 18 from their respective channels on top rail 20, and to remove cross-bow 12 from the vehicle. To remove clip 10 from cross-bow 12, flaps 60 may be gripped and the clip may be pulled from the cross-bow.

From the preceding description of the preferred embodiments it is evident that the objects of the invention are attained by the present invention. Although this invention has been described and illustrated in detail, it is to be clearly understood that the same is by way of illustration and example only and is not to be taken by way of limitation. Therefore, the spirit and scope of this invention are to be limited only by the terms of the appended claims.

What is claimed is:

1. A tonneau cover for mounting to a vehicle comprising:

a frame including a top rail being mounted to said vehicle;

at least one clamp for securing said frame to said vehicle;

a cover secured to said frame for covering a portion of said vehicle;

one or more cross-bows attachable to said frame for supporting said cover;

connecting means for connecting said cross-bow to said top rail of said frame independent of said clamp, such that said connecting means may be positioned at multiple locations along said top rail; and wherein the top rail includes a first channel and a second channel, such that the connecting means connects to at least one of the channels in the top rail; and wherein the connecting means includes a clip for engaging the cross-bow and the top rail, the clip including a first projection and a second protection thereon such that the first projection is receivable within the first channel and the second projection is receivable within the second channel.

* * * * *